(12) United States Patent
Tauchi et al.

(10) Patent No.: US 8,593,519 B2
(45) Date of Patent: Nov. 26, 2013

(54) FIELD WATCH APPARATUS

(75) Inventors: Makiko Tauchi, Kariya (JP); Sei Iguchi, Okazaki (JP); Asako Nagata, Chita (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1458 days.

(21) Appl. No.: 12/068,164

(22) Filed: Feb. 4, 2008

(65) Prior Publication Data

US 2008/0186382 A1  Aug. 7, 2008

(30) Foreign Application Priority Data

Feb. 6, 2007  (JP) .................................. 2007-026951

(51) Int. Cl.
*H04N 7/18* (2006.01)

(52) U.S. Cl.
USPC ........... 348/148; 348/142; 348/143; 348/144; 348/147; 348/149; 348/153; 348/159

(58) Field of Classification Search
USPC ......... 348/148, 149, 142, 143, 144, 147, 153, 348/159
See application file for complete search history.

(56) References Cited

U.S. PATENT DOCUMENTS

| 6,151,539 | A * | 11/2000 | Bergholz et al. ................ 701/25 |
| 7,034,861 | B2 * | 4/2006 | Okada et al. ..................... 348/36 |
| 7,100,190 | B2 * | 8/2006 | Johnson et al. ................ 725/105 |
| 7,161,616 | B1 * | 1/2007 | Okamoto et al. ............. 348/148 |
| 7,272,357 | B2 * | 9/2007 | Nishiga et al. ................ 455/11.1 |
| 7,317,813 | B2 * | 1/2008 | Yanagawa et al. ............ 382/104 |
| 7,592,928 | B2 * | 9/2009 | Chinomi et al. ............ 340/932.2 |
| 7,643,911 | B2 * | 1/2010 | Ishihara et al. .................... 701/1 |
| 7,659,921 | B2 * | 2/2010 | Aoyama ....................... 348/135 |
| 7,734,417 | B2 * | 6/2010 | Chinomi et al. .............. 701/301 |
| 2002/0198660 | A1 * | 12/2002 | Lutter et al. ................... 701/301 |
| 2004/0016870 | A1 * | 1/2004 | Pawlicki et al. ............ 250/208.1 |
| 2006/0119472 | A1 | 6/2006 | Tsuboi |
| 2006/0125919 | A1 * | 6/2006 | Camilleri et al. ............. 348/148 |
| 2006/0152346 | A1 | 7/2006 | Maass et al. |
| 2006/0192660 | A1 * | 8/2006 | Watanabe et al. ............. 340/435 |
| 2006/0204039 | A1 * | 9/2006 | Maemura et al. ............. 382/104 |

(Continued)

FOREIGN PATENT DOCUMENTS

| JP | 09-091596 | 4/1997 |
| JP | 2001-155289 | 6/2001 |

(Continued)

OTHER PUBLICATIONS

Japanese Office Action dated Mar. 31, 2011, issued in corresponding Japanese Application No. 2007-026951 with English Translation.

*Primary Examiner* — Firmin Backer
*Assistant Examiner* — Jonathan Bui
(74) *Attorney, Agent, or Firm* — Nixon & Vanderhye PC

(57) ABSTRACT

A field watch apparatus for use in a subject vehicle acquires a road image from a roadside capture unit located around the subject vehicle on a road and, based on the acquired image, generates an overhead view of a field around the subject vehicle in an intuitively recognizable manner by including a distant surrounding vehicle in the view, thereby providing a precisely understandable view of the field around the subject vehicle for the ease of satisfactorily identifying the distant surrounding vehicle without being compromised by the position of the roadside capture unit.

23 Claims, 8 Drawing Sheets

(56) References Cited

U.S. PATENT DOCUMENTS

| | | | |
|---|---|---|---|
| 2006/0215020 A1* | 9/2006 | Mori et al. | 348/119 |
| 2007/0021915 A1* | 1/2007 | Breed et al. | 701/301 |
| 2007/0109111 A1* | 5/2007 | Breed et al. | 340/435 |
| 2007/0124157 A1* | 5/2007 | Laumeyer et al. | 705/1 |
| 2007/0165910 A1* | 7/2007 | Nagaoka et al. | 382/104 |
| 2007/0171033 A1* | 7/2007 | Nagaoka et al. | 340/435 |
| 2007/0182528 A1* | 8/2007 | Breed et al. | 340/435 |
| 2008/0012940 A1* | 1/2008 | Kanaoka et al. | 348/148 |
| 2008/0042812 A1* | 2/2008 | Dunsmoir et al. | 340/435 |
| 2010/0220189 A1* | 9/2010 | Yanagi | 348/148 |

FOREIGN PATENT DOCUMENTS

| | | |
|---|---|---|
| JP | 2002-232948 | 8/2002 |
| JP | 2003-091793 | 3/2003 |
| JP | 2003-312415 | 11/2003 |
| JP | 2004-326581 | 11/2004 |
| JP | 2005-005978 | 1/2005 |
| JP | 2005-012465 | 1/2005 |
| JP | 2005-216255 | 8/2005 |
| JP | 2006-107521 | 4/2006 |
| JP | 2006-164197 | 6/2006 |
| JP | 2006-282111 | 10/2006 |
| JP | 2006-285399 | 10/2006 |

* cited by examiner

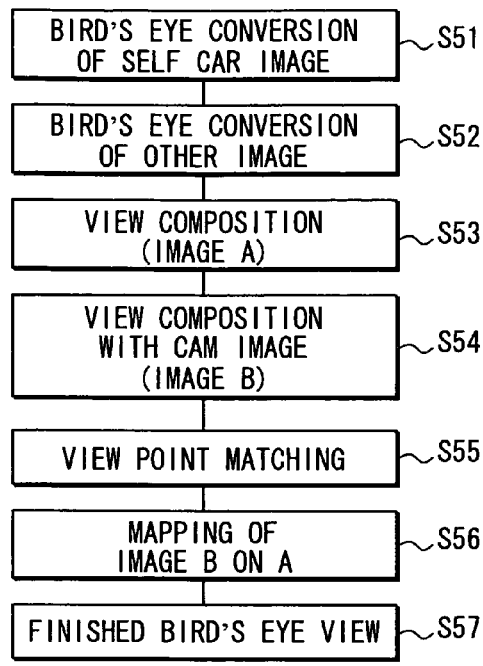
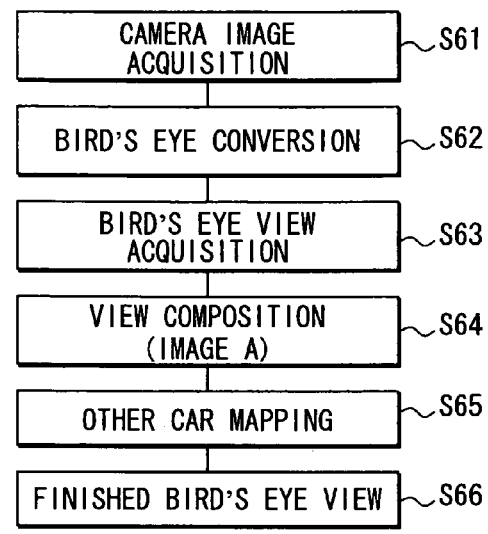
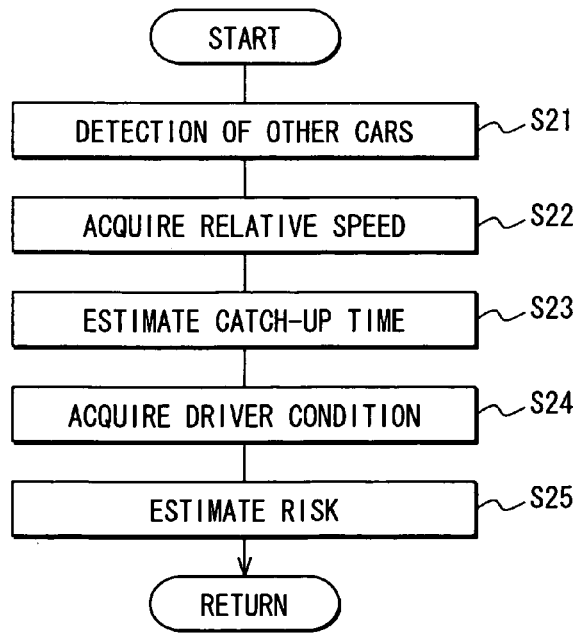

| INFO PROV. | WARNING 1 | WARNING 2 | WARNING 3 |
|---|---|---|---|
| SOUND / VOICE OR NO INFO. | OTHER CARS IN YELLOW | OTHER CARS IN RED | OTHER CARS BLINK IN RED |
| "CARS FROM BEHIND" OR "CARS IN FRONT" OR BEEP SOUND | 213f / 213 | 213f / 213 | 213bf / 213 |

| DRIVER'S COND. | NORMAL | | | MID-LOW | | | LOW | | |
|---|---|---|---|---|---|---|---|---|---|
| CLOSENESS | N | M-F | F | N | M-F | F | N | M-F | F |
| DISPLAY | R | Y | USU. | R | Y | USU. | R | Y | USU. |
| SOUND | × | × | × | ○ | ○ | ○ | ○ | ○ | ○ |
| VIBRATION | × | × | × | × | × | × | ○ | ○ | ○ |

FIELD WATCH APPARATUS

CROSS REFERENCE TO RELATED APPLICATION

This application is based on and claims the benefit of priority of Japanese Patent Application No. 2007-26951 filed on Feb. 6, 2007, the disclosure of which is incorporated herein by reference.

FIELD OF THE DISCLOSURE

The present disclosure generally relates to a field watch/observation apparatus for use in a vehicle.

BACKGROUND INFORMATION

In recent years, various techniques for watching a field around an automobile are disclosed. For example, an apparatus described in a republished patent document WO00/64175 (U.S. Pat. No. 7,161,616) has plural cameras on a subject vehicle that capture a field image around the subject vehicle in various angles, compose those images by shifting viewpoints for generating an overhead view of the subject vehicle, and displays the overhead view on the apparatus. Further, Japanese patent documents such as JP-A-2003-312415, JP-A-2005-5978, JP-A-2002-232948, JP-A-2006-107521, JP-A-2006-282111 disclose a field watch apparatus for monitoring surrounding vehicles condition around a traveling subject vehicle in the overhead view by applying a technique disclosed in the first patent document.

The field watch apparatuses disclosed in the second to fifth patent documents in the above description use only on-board image capture devices disposed on the subject vehicle for generating the overhead view, thereby making it difficult for a distant vehicle to be precisely displayed on a screen, due to smallness of a vehicle in the captured image. In particular, a vehicle approaching to the subject vehicle at a high speed may not be identified as a warning object until a remaining time to have a close contact is too small, due to difficulty of finding the approaching vehicle in the overhead view.

SUMMARY

In view of the above and other problems, the present disclosure provides a field watch apparatus that displays a distant vehicle in an intuitively recognizable manner, thereby providing field watch information regarding a subject vehicle precisely in a form of larger aerial picture.

The field watch apparatus of the present invention includes a road image acquisition unit capable of acquiring a road image that includes another vehicle around the subject vehicle from a roadside capture unit disposed in surroundings of the subject vehicle while the subject vehicle is traveling on a road; an overhead view generation unit capable of generating an overhead view of the subject vehicle with a viewpoint from above the subject vehicle; and a display unit disposed in the subject vehicle and capable of displaying the overhead view of the subject vehicle. The overhead view of the subject vehicle is generated as a view of a real image of a nearby area of the subject vehicle by composing the plural road images respectively captured in different perspectives of the plural roadside capture units with viewpoint shifting, and a position of the subject vehicle is represented in an identifiable manner in the overhead view.

The field watch apparatus of the present invention acquires road images including other vehicles around the subject vehicle from the roadside capture units disposed (in a detached manner relative to the subject vehicle) in a proximity of the subject vehicle on a currently traveling road, and generates the overhead view of a subject vehicle's vicinity. Therefore, the position of the roadside capture unit is not limited relative to the position of the subject vehicle, thereby enabling an acquisition of the road image that leads to generation of the overhead view being sufficiently precise for an identification of the another vehicle even when the another vehicle is distant from the subject vehicle. Further, freedom of perspective setting of the roadside capture unit is improved, thereby leading to the availability of the road image in an otherwise difficult perspective.

BRIEF DESCRIPTION OF THE DRAWINGS

Other objects, features and advantages of the present invention will become more apparent from the following detailed description made with reference to the accompanying drawings, in which:

FIG. 7 shows a flowchart of an image composition process;

FIG. 8 shows another flowchart of the image composition process;

FIG. 9 shows a flowchart of a risk estimation process;

DETAILED DESCRIPTION

Figure 1:
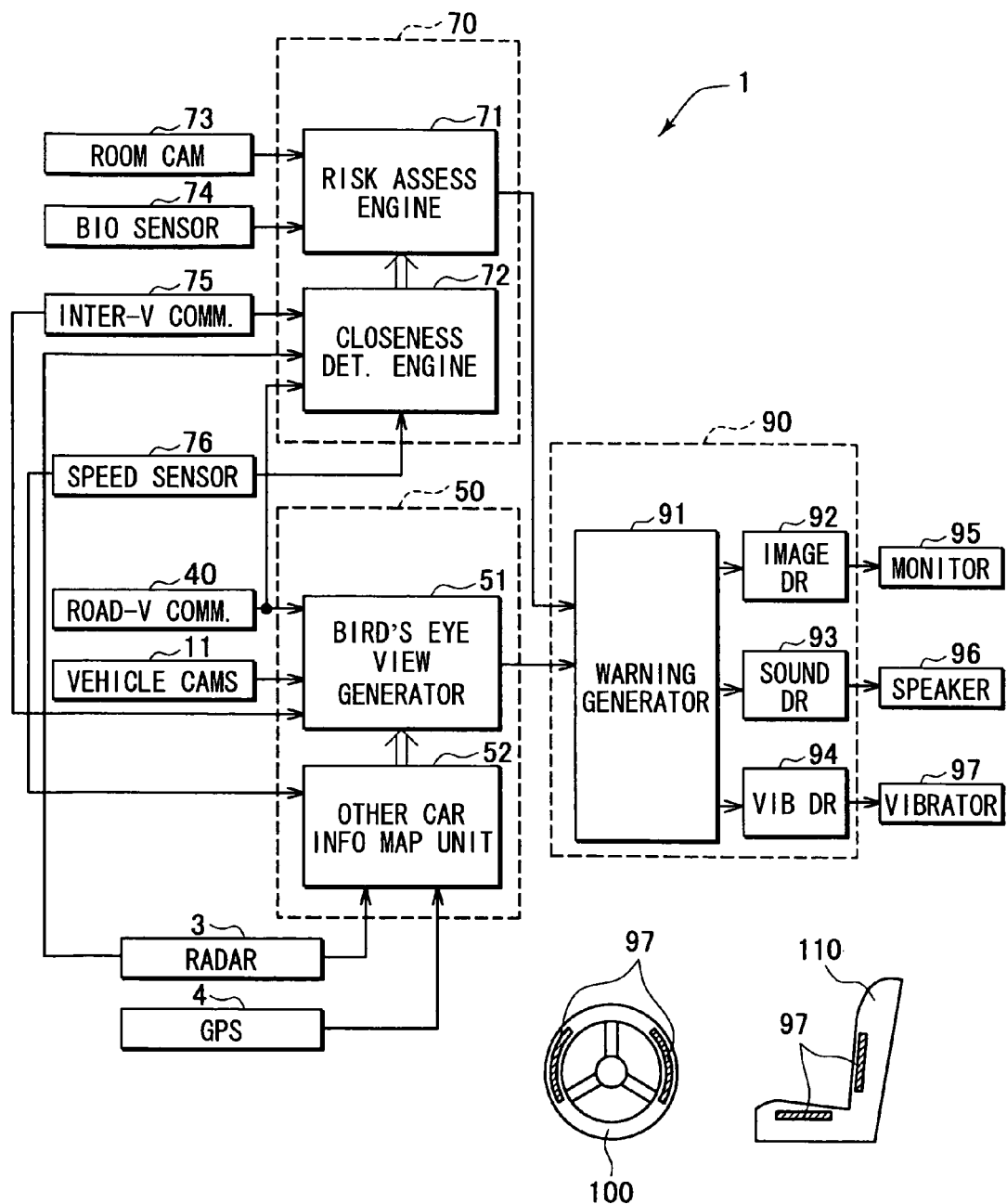
FIG. 1 shows a block diagram of a field watch apparatus in an embodiment of the present invention.

FIG. 1 is a block diagram to show an example of the electric constitution of a vehicular field watch apparatus of the present exemplary embodiment. The vehicular field watch apparatus 1 mainly consists of an ECU that is in charge of total control, with an image ECU 50, a risk estimate ECU 70 and a warning output control ECU 90 connected through a network in the present embodiment. Each of the ECU 50, 70, 90 is constituted of a CPU, a ROM that stores software being executed by the CPU, a RAM as a work memory, and input and output (I/O) portions respectively connected by a bus. That is, those ECUs are microcomputers of well-known types.

Figures 11, 12:
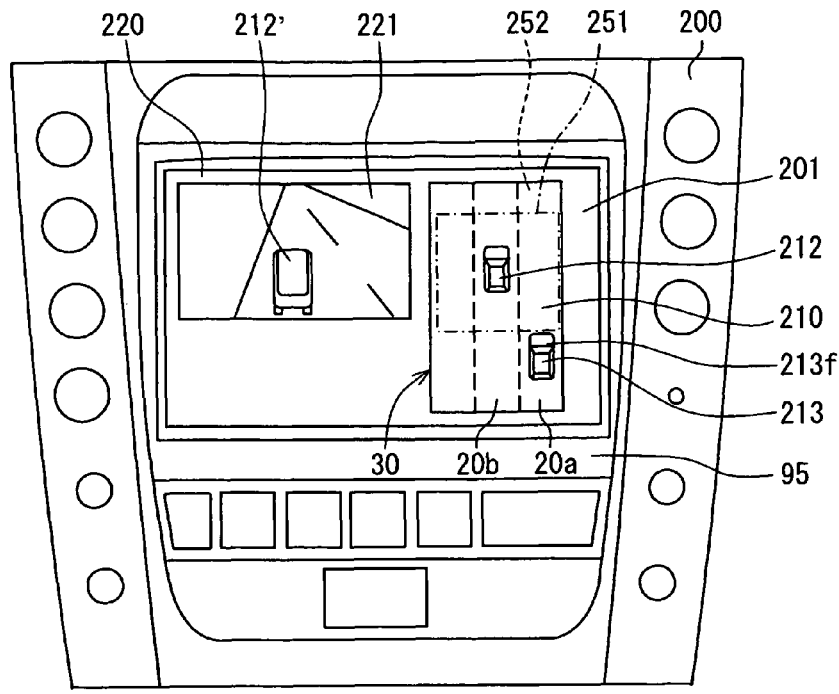
FIG. 11 shows an illustration of a screen of overhead view of a subject vehicle.
FIG. 12 shows an illustration of warnings of other cars.

An in-vehicle camera group 11 is connected to the image ECU 50. In addition, a road-vehicle-communication unit 40 including a radio transmitter-receiver is also connected to the ECU 50 through a communication interface (not illustrated). Furthermore, to the image ECU 50, a GPS 4 for detecting a self car position as well as a radar 3 are respectively connected. In addition, in the image ECU 50, another car information mapping unit 52 and a bird's-eye view generator 51 are provided as functional software implemented therein. Image data and position data from the road-vehicle-communication unit 40 and image data from the in-vehicle camera group 11 are transferred to the bird's-eye view generator 51 for generating a self car circumference overlook image 30 as shown in FIG. 11. In addition, other car detection data from the radar 3 and self car position data from the GPS 4 are transferred to the other car information mapping unit 52. In addition, vehicle speed data from a vehicle speed sensor 76 is transferred to the other car information mapping unit 52.

Further, a room camera 73 in a vehicle compartment photographing the face of the driver and a biometric sensor group 74 (e.g., a thermography imager, a temperature sensor, a sweat sensor, a skin resistance sensor, a heartbeat sensor and the like) acquiring various kinds of biometric information of the driver are connected to the risk estimate ECU 70. In addition, an inter-vehicle communications unit 75 for acquiring image data, position data and the like from other cars by radio transmission is also connected to the ECU 70 through a communication interface. In addition, in the risk estimate ECU 70, a closeness determination engine 72 and a risk assess engine 71 are provided as functional software implemented therein. These engines are used for considering both of distance factors and driver's conditions, that is, for example, providing risk estimation scheme of changing a threshold distance from other cars for risk assessment based on driver's conditions such as fatigue, drowsiness and the like.

The distance of the other car as well as a traveling direction and speed information derived from the radar 3 or the inter-vehicle communications unit 75 are transferred to the closeness determination engine 72 together with the speed information of the self car from the speed sensor 76. In addition, the image data from the room camera 73 in the compartment and the driver's body state detection information from the biometric sensor group 74 are transferred to the risk assess engine 71.

A warning output control ECU 90 has an image driver 92, a sound driver 93 and a vibration driver 94 respectively connected thereto. In addition, the warning contents generator 91 is provided as functional software implemented in the ECU 90. The self car circumference overlook image 30 from the image ECU 50 is transferred to the warning contents generator 91. In addition, from the risk assess engine 71 in the ECU 70, the degree of risk assessment result for an approach of other cars is also transferred to the warning contents generator 91. The warning contents generator 91 processes, by referring to the risk assessment result, marking of the other car image for warning, and generates audio output data as well as control data of the vibration output to be respectively transmitted to the image driver 92, the sound driver 93 and the vibration driver 94.

Figures 13, 14:
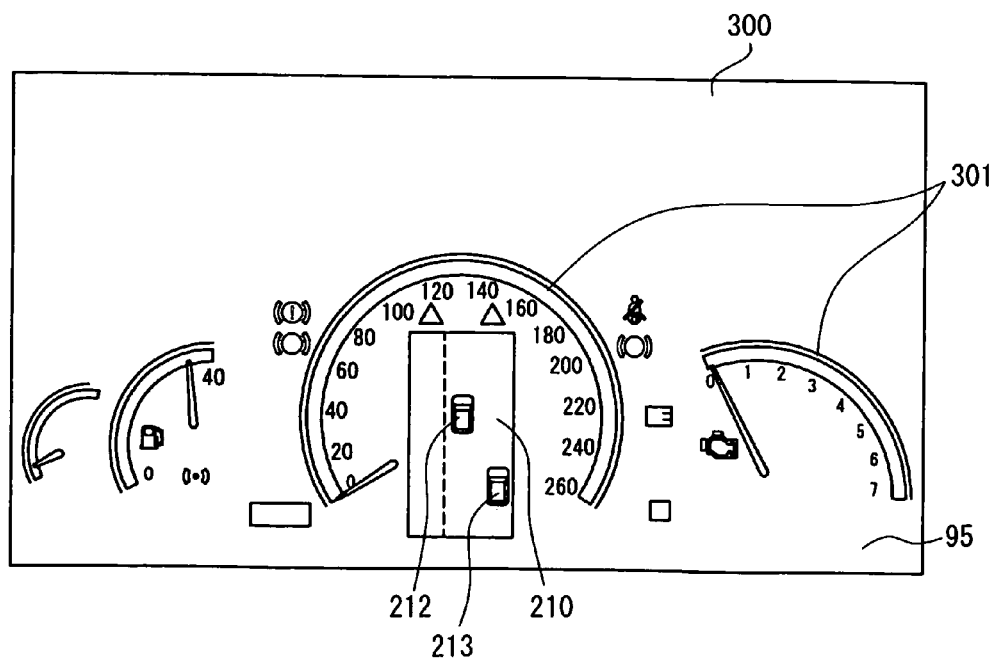
FIG. 13 shows a diagram of composite warnings according to driver's conditions.
FIG. 14 shows another illustration of a screen of overhead view of the subject vehicle.

The self car circumference overlook image 30 with a warning marking is output to the monitor 95 connected to the image driver 92. The monitor 95 may be substituted by a display unit of a car navigation system 200 or an AV unit (at the center of an instrument panel or a center console of the automobile) as shown in FIG. 11, or may be built into a driving indicator 300/301 as shown in FIG. 14. In addition, as shown in FIG. 11, a back monitor image 212' that combines images from the camera group 11 without viewpoint shift is output to the same monitor screen.

In addition, the warning sound by the voice output data is output from a speaker 96 (the speaker system of the AV unit can be used for substitution) connected to the sound driver 93. In addition, the vibration driver 94 that has received control data of vibration output drives a vibrator 97 connected thereto. For example, the vibrator 97 may be incorporated in a steering wheel 100 or a seat 110 (a seat back portion or a sitting surface), for promoting warning recognition or awakening by transmitting warning vibration to the vehicle driver directly.

Figure 2:
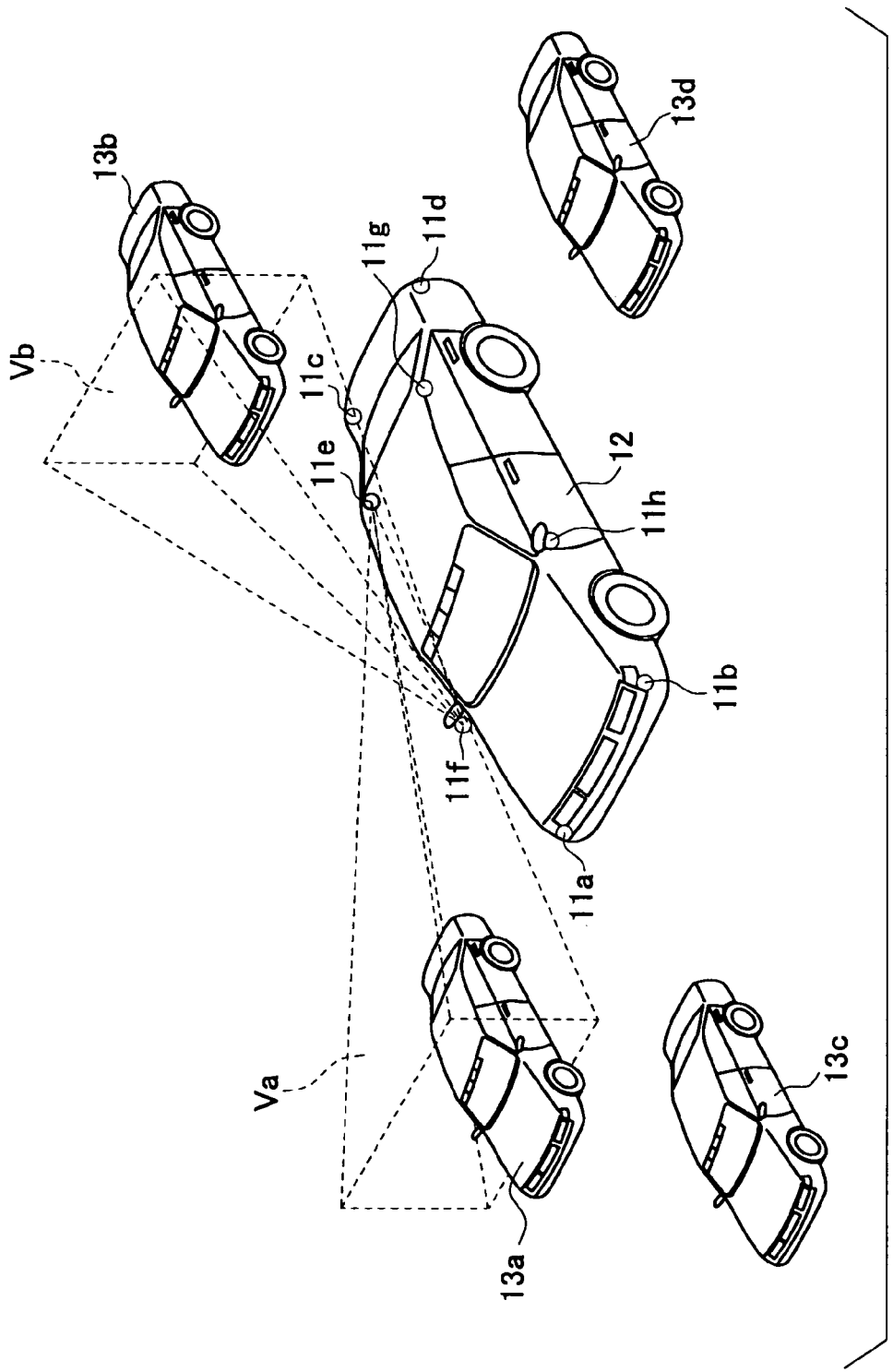
FIG. 2 shows a perspective view of an arrangement of in-vehicle cameras with their fields of vision.

The in-vehicle camera group 11 constitutes a self car side and circumference photography device that photographs around a self car 12, and the image from the camera group 11 is a field and road image in an immediate proximity of the self car 12 derived from plural cameras that respectively capture images in field of visions that continuously surround the self vehicle 12 in combination. The illustration in FIG. 2 shows an example of arrangement of the camera group 11. In this case, eight cameras 11a-11h are disposed on the body of the self car 12. The cameras in the camera group 11 are, a front right camera 11a, a front left camera 11b, a rear right camera 11c, a rear left camera 11d, a right forward camera 11e, a right backward camera 11f, a left forward camera 11g, a left backward camera 11h respectively.

For example, by the right forward camera 11e, an image of a right front side of the self car 12 is captured as a field of vision Va, thus an image including a car 13a that is running in a right front of the self car 12 is captured together with a part of the body of the self car 12 included in the image. In addition, by the right backward camera 11f, an image of the right rear side of the self car 12 is captured as a field of vision Vb, thereby capturing a car 13b that is running in a right side behind the self car 12 in the image, together with the part of the body of the self car 12 included therein. Further, a car 13c in front of the self car 12 as well as a car 13d can be photographed as an image by using the rest of the cameras. The image of the field and road from the cameras 11a-11h is converted three-dimensionally to serve as an overhead view that has a virtual viewpoint above the self car 12 (e.g., right above the center of the self car 12), with an integrated composition of overlaps of adjacent images in consideration, for providing the self car circumference overlook image 30 that continuously represents the area around the self car 12. The viewpoint shift and integration method are disclosed in detail in, for example, the patent document JP-A-2003-312415 and the like. Therefore, description of the viewpoint shift and the integration method is omitted. In addition, the number of the cameras in the camera group 11 may be smaller than the one in the above description. For example, the number of cameras may be decreased to 4 to be disposed at a front, rear, right and left of the self vehicle.

The radar 3 of FIG. 1 is constituted as an ACC radar measuring the distance from the front car and/or the speed of the front car with a laser and/or a millimeter wave, and is disposed in combination with the cameras 11a-11d mentioned above for distance/speed measurement of measured object in a front right side, front left side, rear right side, and rear left side of the self car 12. In addition, the inter-vehicle communications unit 75 directly communicates with the other cars around the self car 12, and exchanges other car information of the other cars (e.g., a vehicle size, speed, brakes, acceleration, position coordinates, a car model, a model number).

Figure 3A:
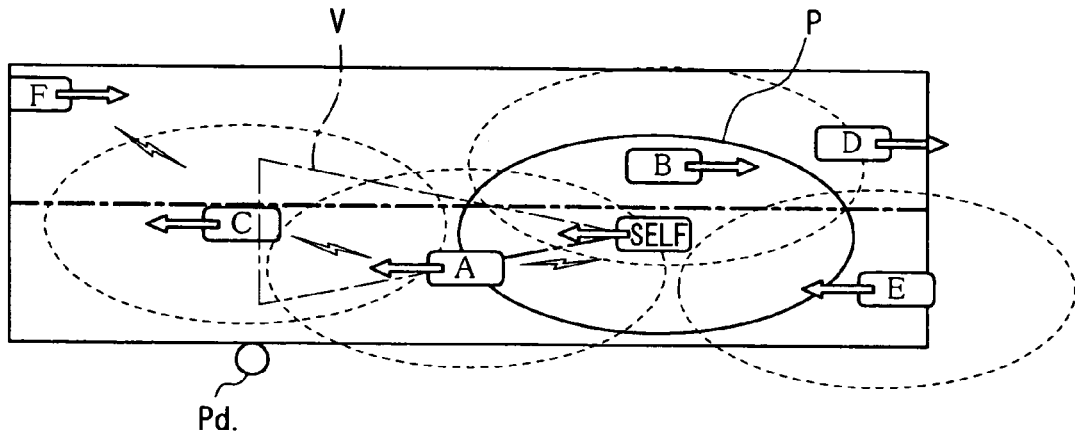
FIGS. 3A and 3B show illustrations of other car detection by using a radar.
Figure 3B:
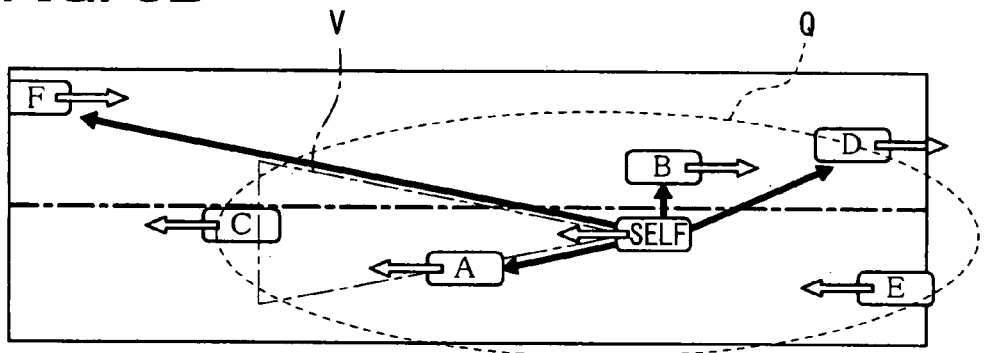

In FIGS. 3A/3B, a method to calculate the position (distance/direction measurement) of the cars (cars A, B, C, D, E, F) in the surroundings (i.e., a circumference vehicle hereinafter) is explained in the following. At first, in the measurement of the distance to the circumference vehicle, transmission electricity power from the inter-vehicle communications unit 75 of the self car 12 is changed, regularly for roughly detecting the distance based on a detection of non-transmission electricity threshold that defines the level of non-transmission of the inter-vehicle communication. In this case, the inter-vehicle communications unit 75 disposed at the center of the backward lamps, for example, makes it easier to accurately measure the inter-vehicle distance based on the communication with the front vehicle, due to the ease of detection result matching between the detection result of the inter-vehicle communication and the detection result of the ACC radar 3. When the ACC radar 3 is compared with the communications unit 75, a measurement range V of the ACC radar 3 is longer than a communication range P of the communications unit 75, thereby first detecting and determining the distance/direction of the inter-vehicle communication by the radar 3 as a preparation for the actual inter-vehicle communication by the communications unit 75. In this manner, the transmission electricity power and the communication direction (Q) of the inter-vehicle communications unit 75 can be set. ("Pd" represents a pedestrian on a sidewalk.)

Figure 4:
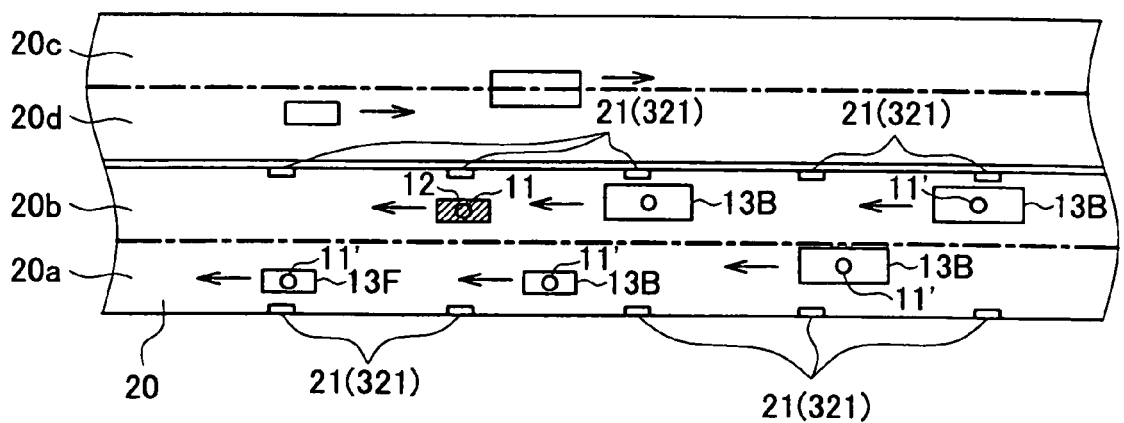
FIG. 4 shows an illustration of an arrangement of cameras on a road.

Plural cameras 21 are, as shown in FIG. 4, disposed at a predetermined interval as an infrastructure of photographing on a road 20 that is being traveled by the self car 12. The road 20 in FIG. 4 has plural lanes 20a, 20b in one traffic direction and lanes 20c, 20d in the other direction, with the cameras 21 for capturing the road and field image for the respective lanes. The cameras 21 may be disposed on a fence, a railing or the like for capturing the vehicle image from a front-sideward of the vehicles, or may be disposed on a post for capturing the vehicle image from above the vehicles. Further, cameras 21 have road side communications units 321 respectively disposed thereon for transmitting the road and field image from the cameras 21 together with the position of photographing to the road-vehicle-communication unit 40 on the vehicle.

The cameras 21 are used for capturing the road and field image including the cars around the self car 12, or more practically, a far front and/or a far rear field of the self car 12 relative to the field of vision by the camera group 11. The position of the self car 12 is detected by the above-mentioned GPS in a timely manner, and data from the cameras 21 is selectively received by identifying the cameras 21 within a predetermined frontward/backward range through the road-vehicle-communication unit 40. The received data of road and field image undergoes viewpoint shift processing by the bird's-eye view generator 51, thereby being combined to generate the self car circumference overlook image 30 as shown in FIG. 11. That is, more practically, the image 30 in FIG. 11 is composed by supplementing an image 251 from the camera group 11 with an image 252 from the camera 21 at a far front or a far rear area at a predetermined distance from the self car 12. More practically, the self car circumference overlook image 30 is generated by including an image 213 of another car traveling behind the self car 12 by at least the length of the self car 12 distant from the self car 12 in the self car traveling lane 20b or in the adjacent lane 20a.

In addition, as shown in FIG. 4, an in-vehicle camera 11' disposed on the other car 13 (including 13F, 13B) that is traveling around the self car 12 is configured in the same manner as the camera group 11, and the image from the camera 11' is available to be transmitted through the communications unit 75 for composing the overlook image 30.

Operation of the vehicular field watch apparatus 1 is described based on a flowchart as follows. That is, in FIG. 5, a flow of main processing that is performed by the cooperation of three ECU's 50, 70, 90 is shown. First, step S1 is a step for generating of the self car circumference overlook image by the image ECU 50, and step S2 is a step for risk estimate processing ("risk assessment") by the risk estimate ECU 70 carried out in parallel. Then, steps S3 and S4 are steps for warning contents determination processing by the warning output control ECU 90 and warning output processing respectively performed in accordance with the other car existence situation in the self car circumference overlook image 30 and a risk estimate result of step S2. The main processing is carried out repeatedly at a predetermined time interval while updating a processing result. In addition, it is possible to carry out the entire main processing integrally in one large scale ECU if the capacity of the ECU is sufficient.

Figure 6:
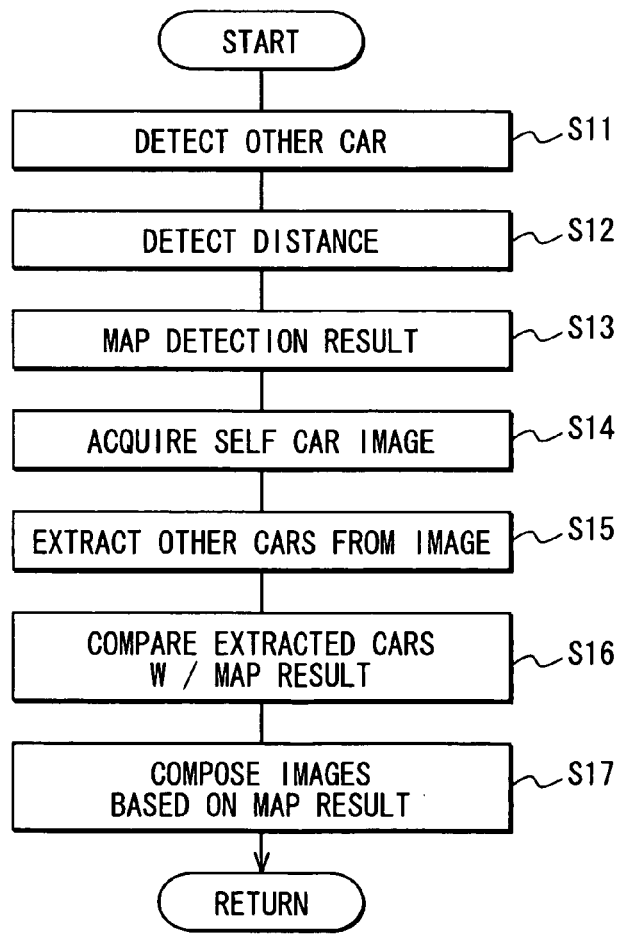
FIG. 6 shows a flowchart of an overhead view generation process.

FIG. 6 shows the details of a generation process of the self car circumference overlook images (S1). At first, by processing by the other car information mapping unit 52 (FIG. 1), the detection information of the other car by the radar 3 is acquired in step S11 before acquiring the road and filed image, and the information of the existence direction of the other car 13 relative to the self car 12 as well as the distance information regarding the self car 12 and the other car 13 are acquired based on the analysis of the detection information in step S12. Then, in step S13, based on the distance information and the existence direction information mentioned above, mapping information of the other car 13 in the surroundings of the self car 12 is generated. More practically, the position of the other car is mapped on a polar coordinate plane that is defined in parallel to the road surface with the position of the self car 12 as its origin and a radius and a displacement angle of the other car respectively derived from the distance information and the existence direction information.

Then, in step S14, the viewpoint shift processing of well known type is performed after acquiring the images from the camera group 11 and the camera 21, as well as the images from the camera 11' on the other car 13 in the surroundings of the self car 12. After the acquisition of the images, the image is analyzed by using a well known analysis method to extract an image of the other car in the viewpoint-shifted images in step S15. Then, if there is the other car in the image, the position of the extracted image of the other car relative to the self car 12 is detected by considering the photography direction and the field of vision of each of the cameras, and the detected position of the other car is compared with the mapping result of the other car's position in step S16. In step S17, the images after the viewpoint shift are, composed as the self car circumference overlook image 30 with the images of the "real" other cars that are identified as actually existing based on the comparison with the mapping result.

FIG. 7 shows an example of the flow of the self car circumference overlook image generation processing when the camera 21 is used. At first, in step S51, the image of the camera 21 that is positioned to capture the self car 12 in the image is acquired for position adjustment of the in-vehicle camera group 11 on the self car 12, and a viewpoint of the image is converted to a bird's-eye view (the image always includes the image of the self car 12: the viewpoint is shifted to a direct top of the self car (that is, the image is composed as a plan view)). Then, in step S52, the image of the front field or the rear field of the self car 12 in the field of view detached from the direct surrounding of the self car 12 is acquired from the camera 21 that is positioned to capture an appropriate image that can be seamlessly combined with the image acquired in step S51 for viewpoint shift. Then, in step S53, both of the images acquired in steps S51 and S52 are composed as a composite image A.

Then, in step S54, each of the images from the in-vehicle camera group 11 is converted into the overhead view, or the bird's-eye view, successively, and the converted images are composed as a composite image B. In the image by the in-vehicle camera group 11 and its composite image B, the image of the self car 12 is only included partially. Therefore, in step S55, the viewpoint of the composite image A that includes the self car 12 image is aligned with the viewpoint of the composite image B that partially includes the self car 12 image in a position matching manner, and in step S56, the matched images are composed to include only the images of the matching other cars reflected therein. Finally, in step S57, the self car circumference overlook image 30 is completed. In this manner, the image of the self car 12 can be included as a real image from the camera 21 in the self car circumference overlook image 30. However, alternatively, the image of the self car 12 may be composed in the self car circumference overlook image 30 by using a prefixed image of the self car 12 as a substitution.

FIG. 8 shows a flow of processing when the camera 11' on the other car is used. In step S61, each of the images of the in-vehicle camera group 11 of the self car 12 is acquired, and viewpoint is converted into the bird's-eye view in step S62. Then, in step S63, the inter-vehicle communication is performed with the other cars in the surroundings that are discovered by the radar 3, and the images from the camera group 11 on the other car 13 are acquired as the images after conversion to the plan view. In step S64, the bird's-eye view acquired from the other car 13 is combined with the bird's-eye view from the camera group 11 of the self car 12, for composing the composite image A. Then, on the composite image A, the other car image identified in the mapping result is exclusively reflected for completing the self car circumference overlook image 30 (S66).

Figure 5:
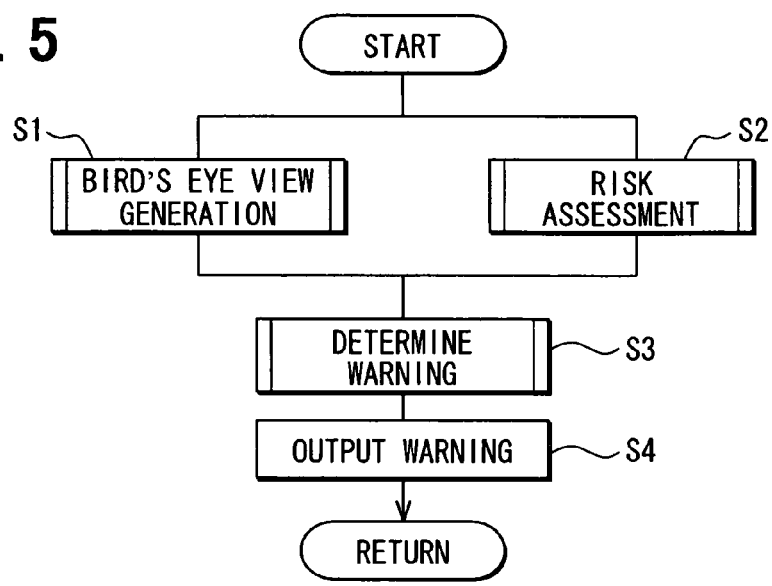
FIG. 5 shows a flowchart of a main process in the field watch apparatus.

FIG. 9 shows a flow of the risk estimate processing (S2 in FIG. 5). In step S21, the process performs an other car detection process by the method that has already been explained with the radar 3. The distance to the detected other car as well as the speed is acquired as information in step S22, and a relative approach speed of the self car toward the other car is calculated as a difference of the speed of the self car. Then, in step S23, a catch-up time of the other car is estimated based on the distance (i.e., a spatial distance in a narrow sense) from the other car and the relative approach speed when the relative approach speed has a positive value.

Then, in step S24, a physical condition of the driver is acquired as information from the biometric sensor group 74. The estimation method of the driver's condition based on the biometric sensing is a well-known technique as disclosed in, for example, the patent document JP-A-2006-282111. Therefore, the technique is only briefly explained in the following. That is, the following sensors can serve as the biometric sensors:

Infra-red sensor: a thermo-graphical image is captured by the infrared sensor about the face portion of the driver for detecting the body temperature based on the radiated infrared ray.

Face camera (the room camera 73): the camera is used to capture a facial expression of the driver sitting in the driver's seat. Further, the eye direction of the driver is utilized for detecting the level of attentiveness of the driver.

Microphone: the microphone is used to pick up the voice of the driver.

Pressure sensor: the pressure sensor is disposed at a position to be grasped by the driver on the steering wheel, the shift lever or the like for detecting the grasping force as well as a frequency of grip and release.

Pulse sensor: the pulse sensor as a reflective light sensor or the like is disposed at the grasping position on the steering wheel of the vehicle for detecting the blood stream of the driver that reflects the pulse.

Body temperature sensor: the temperature sensor is disposed at the grasping position on the steering wheel of the vehicle.

The driver's condition is determined, for example, based on the captured image in the following manner. That is, captured image of the driver's face (as a whole or as a part of the face such as an eye, a mouth or the like) from the face camera is compared with master images that templates various psychological conditions and/or physical conditions to determine that a user is in an anger/serenity, in a good temper (cheerfully)/in a bad temper (in disappointment or sorrow), or in anxiety/tension. Further, instead of applying a particular master image for respective users, extracting a facial outline, an eye shape, a mouth/nose position/shape as common facial characteristics for all users and the extracted characteristics may be compared with predetermined standard characteristics for the above determination.

The body movement may be detected based on the moving picture of the user captured by the face camera (e.g., a shivering movement, a frowning) and/or information from the pressure sensor or the like (e.g., a frequent release of the hand from the steering wheel, or the like) for determining that the user is irritated or not while he/she is driving the vehicle.

The body temperature is detected either by the body temperature sensor on the steering wheel or by the thermographic image from the infra-red sensor. The body temperature may rise when the user's feeling is lifted, excited, or is offended, and may drop when the user's feeling is kept in calm. In addition, the strain and/or the excitement may be detected as the increase of pulse counts from the pulse sensor.

Further, the body temperature may rise when the user is in a physical condition such as being tired or in distraction regardless of the psychological condition. The cause of the temperature rise may be determined based on the combination of the facial expression (the face camera) or the body movement (the face camera/pressure sensor) with other information that represents the user's condition. Furthermore, the temperature rise due to the strain, excitement or the emotional response may be distinguished as a temporal temperature increase from the stationary fever due to a poor physical condition. In addition, when the user's normal temperature is being sampled and registered, the temperature shift from the registered normal temperature (e.g., a shift for higher temperature in particular) may enable a detection of a more subtle emotional change or the like.

In the present embodiment, the physical/emotional condition detection result is used to classify the driver's condition into plural levels, that is, three levels of the normal, the medium-low, and the low in this case, as shown in FIG. 13 for the risk estimation (S25), and for providing a suitable warning for respective levels. More practically, the warning is provided only from the monitor when the user is classified as "Normal," with the addition of voice warning when the user is in "Medium-Low," and further with the vibration when the user is classified as in "Low." In addition, the threshold of closeness of the other car in three levels of "Near (N)" "Medium-far (M-F)" and "Far (F)" reflected in the risk estimation is defined in a manner that reserves a longer time for the user in the lower condition toward the classification of "low." That is, in other words, when the user's response is considered to be slower, the warning is provided earlier. ("R" "Y" "USU." in the diagram of FIG. 13 respectively represent "Red," "Yellow," and "As Usual.")

Figure 10:
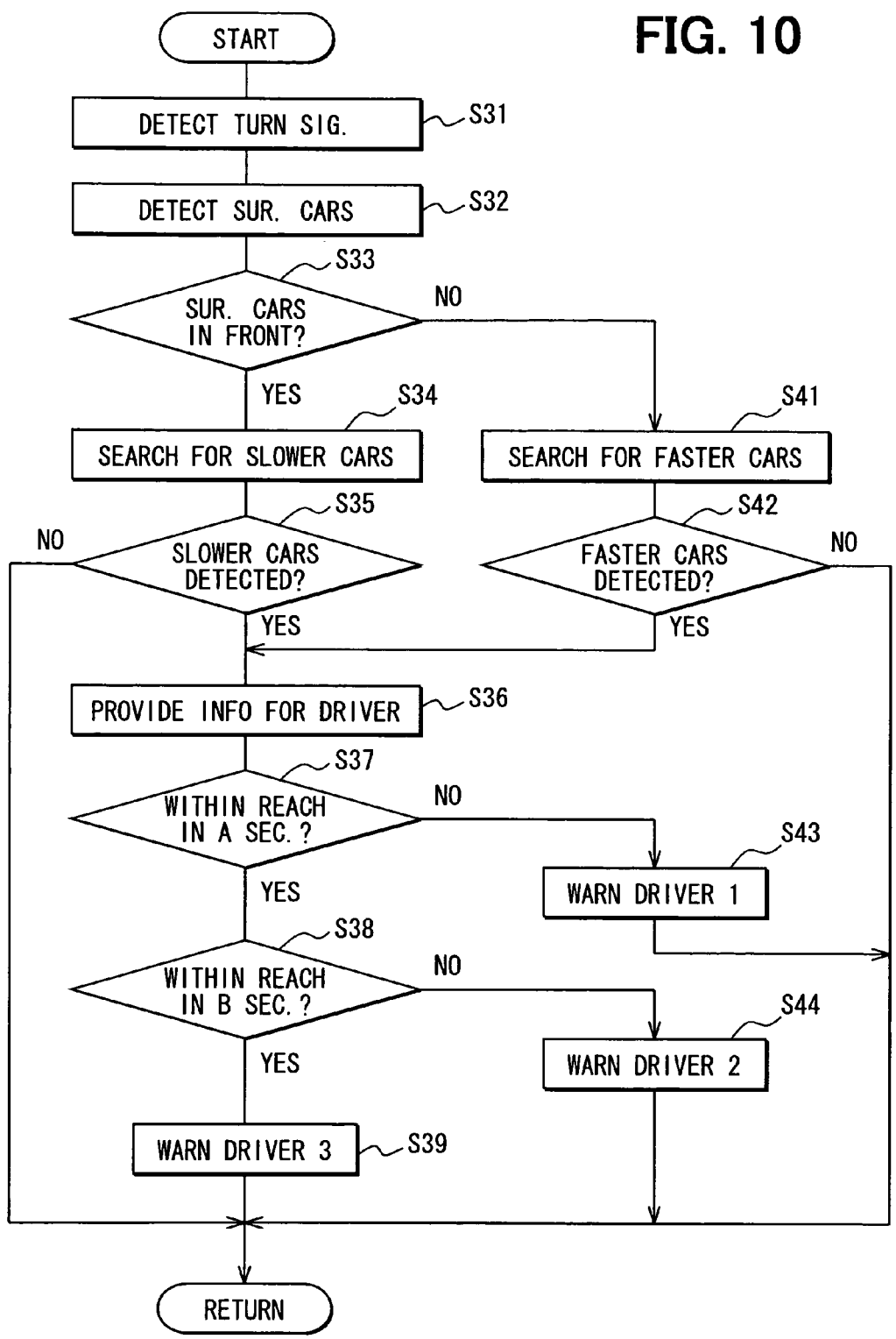
FIG. 10 shows a flowchart of a warning content determination process.

FIG. 10 shows a flow of warning contents determination and output (in steps S3, S4). The chart depicts an example of lane change by the driver of the self car. In step S31, an operation of the turn signal for a lane change is detected.

Then, the existence of the other car is confirmed on the self car circumference overlook image 30 (i.e., a detection of surrounding cars) in step S32. In step S33, whether the other car is in front of the self car or in the rear of the self car is confirmed. When the other car is existing in front of the self car, whether a slower car in comparison to the self car is included in the other car is determined. When there is a slower car, the process proceeds from step S35 to S36 for providing information that includes a warning for the driver. On the other hand, when the other car is detected in the rear of the self car in step S33, a faster car detection is performed in step S41 for finding a faster car that is traveling faster than the self car. When a faster car is found in the rear of the self car, the process proceeds from step S42 to S36 for providing information that includes the warning (If no slower/faster car is detected, the process concludes itself without performing any process).

In the following, individual warning processing for the other car depending on the distance is described. That is, when a threshold of the distance from the other car in the above description is defined as exceeding A seconds as "Far," the process proceeds from step S37 to S43 for providing the driver with warning 1. When a threshold of the distance from the other car is defined as exceeding B seconds and within or equal to A seconds as "Medium-Far," the process proceeds from step S38 to S44 for providing the driver with warning 2. Further, when a threshold of the distance from the other car is defined as within or equal to B seconds as "Near," the process proceeds from step S38 to S39 for providing the driver with warning 3. FIG. 12 shows the example of the warnings 1-3 described above. That is, the warning of other car is provided in a form that the object of warning (i.e., the other car image 213) is marked in a predetermined color on the screen. More practically, marking frames 213f, 213bf for outlining the other car image 213 in the self car circumference overlook image 30 are distinguished for each of the warnings 1-3 depending on the distance. That is, when the other car is classified as "Far," the marking frame 213f is displayed in yellow, and when the other car is classified as "Medium-Far," the marking frame 213f is displayed in red. Further, when the other car is classified as "Near," the red marking frame 213bf is displayed as a blinking frame.

In addition, the warning for the lowered driver's condition may be provided as a simple alarm sound, or may be vocally provided as concrete warning contents. For example, the vocal message may sound:

"Dangerous vehicle from behind" (or "Warning: Faster car is catching up from behind.");
"Dangerous vehicle ahead" (or "Warning: Slow car is in front.");
"A vehicle is approaching. Stay on a current lane."
"A vehicle is ahead. Stay on a current lane."

Further, the warning may be provided depending on the spatial distance instead of the distance of the catch-up time of the other car, or may be provided depending on the speed of the other cars. Furthermore, the warning may be replaced with the figure of the spatial distance/the speed of the other car displayed on the screen.

What is claimed is:

1. A field watch apparatus for use by a subject vehicle comprising:
   a plurality of road image acquisition units, each being disposed at respective predetermined intervals from each other on respectively associated structures fixedly situated with respect to the earth along a vehicle roadway and being configured to acquire at least a first road image that includes the subject vehicle from a first of said road image acquisition units and a second road image, different from the first road image, that includes a front or a rear field view relative to the subject vehicle from a second of said road image acquisition units;
   an overhead view generation unit configured to generate an overhead view of the subject vehicle with a viewpoint from above the subject vehicle, wherein the overhead view of the subject vehicle is generated as a view of a real image of a nearby area of the subject vehicle by composing at least the first road image and the second road image; and
   a display unit disposed in the subject vehicle and configured to display the overhead view of the subject vehicle, wherein a position of the subject vehicle is represented in an identifiable manner in the overhead view.

2. The field watch apparatus of claim 1 further comprising:
   a surrounding capture unit disposed in the subject vehicle and configured to capture an image of the subject vehicle surroundings, wherein
   the overhead view generation unit generates the overhead view based on both of the image of vehicle surroundings from the surrounding capture unit and the first road image and the second road image from said first image acquisition unit and said second road image acquisition unit.

3. The field watch apparatus of claim 2, wherein the second road image acquisition unit captures at least one of the road image of a far front area and a far rear area of the subject vehicle relative to a capture perspective of the surrounding capture unit, and
   the overhead view generation unit generates the overhead view of the subject vehicle by supplementing the surroundings image from the surrounding capture unit with the first road image and the second road image from the said first road image acquisition unit and said second road image acquisition unit at a position that is at least a predetermined distance away from the subject vehicle in one of a front and a rear of the subject vehicle.

4. The field watch apparatus of claim 3, wherein the overhead view generation unit generates the overhead view of the subject vehicle so that another vehicle's image traveling at a position that is at least subject vehicle's length backwardly away from the subject vehicle in one of a subject vehicle's lane and an adjacent lane of the subject vehicle's lane is included therein.

5. A field watch apparatus for use in a subject vehicle comprising:
   a plurality of road image acquisition units that are predisposed at predetermined intervals on a road on which a subject vehicle is traveling and a vehicle camera disposed on another vehicle traveling around the subject vehicle, wherein the plurality of road image acquisition units are on respectively associated structures fixedly situated with respect to the earth;
   a first of said road image acquisition units configured to acquire a first road image that includes the subject vehicle and another vehicle from said first roadside capture unit, a second of said roadside capture units configured to acquire a second road image, different from the first road image, that includes a front or a rear field view relative to the subject vehicle, and the vehicle camera disposed on another vehicle configured to acquire a first vehicle image, different from the first and the second road images, that includes the subject vehicle;
   an overhead view generation unit configured to generate an overhead view of the subject vehicle with a viewpoint from above the subject vehicle, wherein the overhead view of the subject vehicle is generated as a view of a real image of a nearby area of the subject vehicle by composing at least the first and second road images and the first vehicle image; and a display unit disposed in the subject vehicle and configured to display the overhead view of the subject vehicle, wherein a position of the subject vehicle is represented in an identifiable manner in the overhead view.

6. The field watch apparatus of claim 1 further comprising:
a vehicle identify unit configured to identify another vehicle's image in the overhead view of the subject vehicle;
a distance detection unit configured to detect a distance to another vehicle around the subject vehicle; and
a distance output unit configured to output information on the distance to the another vehicle, wherein the distance to the another vehicle is output on the overhead view of the subject vehicle in a manner that identifies a corresponding another vehicle's image.

7. The field watch apparatus of claim 6, wherein the distance detection unit is a unit configured to detect a distance to the another vehicle that is disposed on the subject vehicle separately from an image acquisition device that serves for generation of the overhead view of the subject vehicle.

8. The field watch apparatus of claim 7 further comprising:
a vehicle mapping unit in another vehicle, wherein
the distance detection unit is configured to acquire direction information of said another vehicle from the subject vehicle as well as to acquire distance information from the subject vehicle to said another vehicle,
said another vehicle mapping unit configured to generate mapping information that maps the another vehicle around the subject vehicle based on the distance information and the direction information, and
the another vehicle identify unit refers to the another vehicle mapping information for correcting an identification result of the another vehicle's image on the overhead view of the subject vehicle.

9. The field watch apparatus of claim 7, wherein
the distance detection unit is a radar distance measurement device.

10. The field watch apparatus of claim 6, wherein
the distance detection unit includes a marking unit that is configured to put a different mark on said another vehicle's image in the overhead view of the subject vehicle according to the detected distance to said another vehicle.

11. The field watch apparatus of claim 10, wherein
the marking unit uses a different color for marking the another vehicle's image according to the detected distance.

12. The field watch apparatus of claim 10, wherein
the marking unit uses a different marking frame that borders the another vehicle's image in the overhead view of the subject vehicle according to the detected distance.

13. The field watch apparatus of claim 6 further comprising:
a warning information output unit that outputs warning information when the overhead view of the subject vehicle includes the another vehicle that has the distance detected by the distance detection unit being within a predetermined warning distance.

14. The field watch apparatus of claim 13 further comprising:
a relative approach speed identify unit that identifies a relative approach speed of the another vehicle from behind the subject vehicle, wherein the warning information output unit outputs the warning information when the overhead view of the subject vehicle includes the another vehicle that has the relative approach speed of positive value being greater than a predetermined warning approach speed.

15. The field watch apparatus of claim 13 further comprising:
a catch-up time calculation unit configured to calculate catch-up information that reflects a catch-up time of the another vehicle from behind the subject vehicle based on the distance detected by the distance detection unit and the relative approach speed identified by the relative approach speed identify unit, wherein
the warning information output unit outputs the warning information when the overhead view of the subject vehicle includes the another vehicle that has the catch-up time being smaller than a predetermined warning catch-up time.

16. The field watch apparatus of claim 13, wherein
the warning information output unit includes a warning marking generation unit configured to mark the image of the another vehicle that is treated as a warning object in the overhead view of the subject vehicle in a distinctively recognizable manner from the images of the vehicles that are not treated as the warning objects.

17. The field watch apparatus of claim 16, wherein
the warning marking generation unit uses a predetermined color for marking the image of the another vehicle that is treated as the warning object.

18. The field watch apparatus of claim 13 further comprising:
a warning sound output unit configured to provide sound output of the warning information, wherein the warning sound output unit is included in the warning information output unit.

19. The field watch apparatus of claim 1, wherein
the overhead view generation unit generates the overhead view of the subject vehicle by partially substituting the overhead view with a substitution image that is not derived from the first road image or the second road image.

20. The field watch apparatus of claim 19, wherein
the substitution image is an image of the subject vehicle.

21. The field watch apparatus of claim 13,
wherein the overhead view generation unit generates the overhead view of the subject vehicle when the subject vehicle provides a turn signal operation to change a travel lane; and
the another vehicle identify unit identifies at least one other vehicle that is traveling in front of or behind the subject vehicle,
wherein when the another vehicle is traveling in front of the subject vehicle at a speed less than a predetermined value, the warning information output unit provides a warning, and
wherein when the another vehicle is traveling behind the subject vehicle at a speed greater than a predetermined value, the warning information output unit provides a warning.

22. The field watch apparatus of claim 13, further comprising:
a driver awareness assessment unit that determines a condition level of a driver based on various inputs from a plurality of sensors,
wherein the warning information output unit provides a warning based on the condition level provided by the driver awareness assessment unit.

23. The field watch apparatus of claim 22, wherein the warning information output unit provides a warning earlier when the condition level of the driver is determined as low as compared to a warning provided when the condition level of the driver is determined as normal.

* * * * *